T. K. DIXON.
AUTOMATIC LOCKING DEVICE.
APPLICATION FILED MAY 14, 1918.
1,365,895.
Patented Jan. 18, 1921.
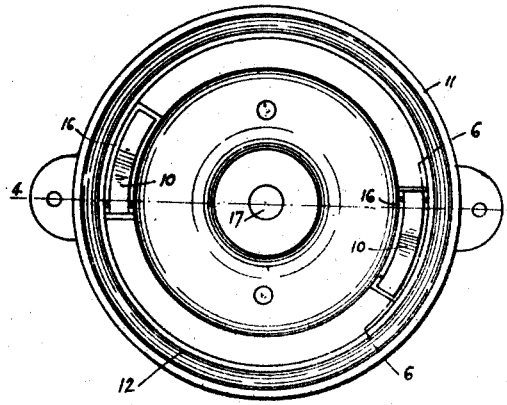
Fig. 1.
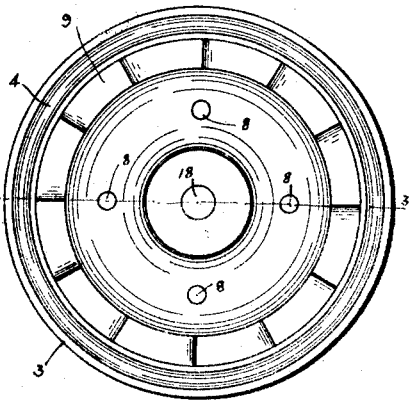
Fig. 2.
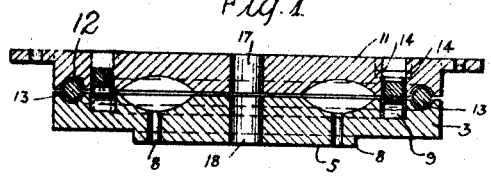
Fig. 4.
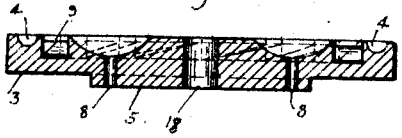
Fig. 3.
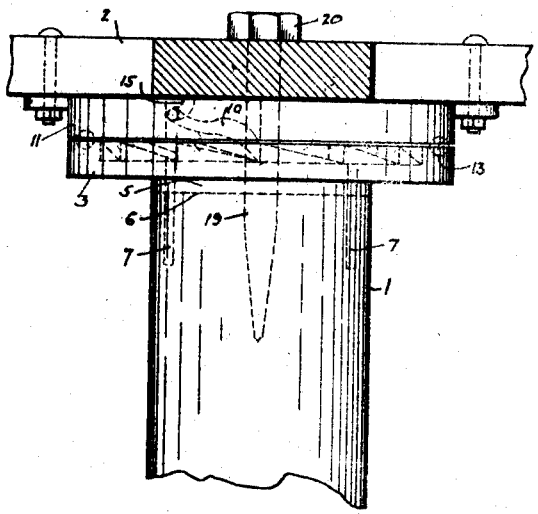
Fig. 5.
Fig. 6.
INVENTOR
Thomas K. Dixon
BY
Hardway Railey
ATTORNEYS.

UNITED STATES PATENT OFFICE.

THOMAS K. DIXON, OF HOUSTON, TEXAS.

AUTOMATIC LOCKING DEVICE.

1,365,895.  Specification of Letters Patent.  Patented Jan. 18, 1921.

Application filed May 14, 1918. Serial No. 234,487.

*To all whom it may concern:*

Be it known that I, THOMAS K. DIXON, a citizen of the United States, residing at Houston, in the county of Harris and State of Texas, have invented certain new and useful Improvements in Automatic Locking Devices, of which the following is a specification.

This invention relates to new and useful improvements in an automatic locking device.

The object of the invention is to provide a device of the character described, which is adapted to be used on turnstiles, gates, doors, and the like, and which permits the same to turn or swing in one direction only, and which automatically locks to prevent them from being turned in the opposite direction. The device is particularly adapted for use on a turnstile, and may be applied either to the top or bottom.

With the above and other objects in view, the invention has particular relation to certain novel features of construction, operation and arrangement of parts, an example of which is given in this specification and illustrated in the accompanying drawings, wherein:

Figure 1, is a bottom view of the top plate.

Fig. 2 is a plan view of the bottom plate.

Fig. 3, is a transverse sectional view, of the bottom plate, taken on the line 3—3 of Fig. 2.

Fig. 4 is a transverse sectional view, taken on the line 4—4 of Fig. 1, and

Fig. 5, is a fragmentary side elevation of the device, and

Fig. 6, is a fragmentary sectional view, taken on the line 6—6 of Fig. 1.

Referring now more particularly to the drawings wherein like numerals of reference designate similar parts in each of the figures, the numeral 1 refers to a stationary post, whereon the turnstile 2 is mounted. Fixed to the top of the post is the bottom plate 3, having an annular raceway 4, in the upper face thereof. The underside of this plate has the tenon 5, which fits into a transverse groove 6, in the top of the post to prevent the plate 3 from turning and said plate is secured on said post by means of nails or screws 7, which are driven through orifices 8, in said plate. Within the raceway 4, the bottom plate is provided with an annular ratchet face 9, with which the pawls 10 engage.

Fastened to the underside of the turnstile 2, is a top plate 11, whose underside has the annular raceway 12, coinciding with the raceway 4, of the bottom plate, and provided to receive the anti-friction, bearings 13. The anchored ends of the pawls 10 have laterally extending studs 14, which fit into the inclined bearings 15, provided for them in the upper plate 11, and said pawls work through the slots 16, cut through said upper plate, the free ends of said pawls coöperating with the ratchet face 9. The upper and lower plates are provided with alined central bearings 17 and 18, and a bearing pin 19, having an enlarged head 20, is driven through said bearings into the upper end of the post 1, its upper end forming a bearing for the turnstile and the head 20, preventing the displacement of the turnstile.

It is obvious that if the turnstile is turned in one direction, the pawls 10 will operate idly, but will at all times be in position to engage with the teeth of the face 9 to lock the turnstile against rotation in the other direction.

What I claim is:

A locking device for a turnstile, including a support, having a transverse mortise, a bottom plate having a tenon formed on its underside and having its upper face formed into an annular ratchet face and provided with an annular raceway, an upper plate mounted on the lower plate, and having an annular raceway therearound coinciding with said first mentioned raceway, balls forming anti-friction bearings in said raceways, and forming a bearing for the turnstile, said rotatable plate being provided with a slot, a pawl pivoted loosely to the upper plate, and working through said slot, and co-acting with said ratchet face in such a manner as to permit the rotatable plate to turn in one direction, but to lock it against rotation in the other direction, said plates having central bearings, and a spike passing through the bearings and driven into said support.

In testimony whereof I have signed my name to this specification in the presence of two subscribing witnesses.

THOMAS K. DIXON.

Witnesses:
 E. L. CATHEY,
 IRENE BRUNS.